US007097115B2

(12) United States Patent
Jiang et al.

(10) Patent No.: US 7,097,115 B2
(45) Date of Patent: Aug. 29, 2006

(54) FUEL INJECTOR REGULATOR HAVING COMBINED INITIAL INJECTION AND PEAK INJECTION PRESSURE REGULATION

(75) Inventors: He Jiang, Canton, MI (US); Gerald Gaydek, Plymouth, MI (US)

(73) Assignee: Detroit Diesel Corporation, Detroit, MI (US)

( * ) Notice: Subject to any disclaimer, the term of this patent is extended or adjusted under 35 U.S.C. 154(b) by 143 days.

(21) Appl. No.: 11/003,629

(22) Filed: Dec. 3, 2004

(65) Prior Publication Data

US 2006/0118659 A1 Jun. 8, 2006

(51) Int. Cl.
*F02M 47/02* (2006.01)
*F02M 59/00* (2006.01)
*F02M 61/00* (2006.01)
*B64D 9/00* (2006.01)
*B05B 1/30* (2006.01)

(52) U.S. Cl. ............................ 239/88; 239/89; 239/90; 239/533.2; 239/533.12; 239/127; 239/585.1; 239/585.4; 239/585.5

(58) Field of Classification Search ............ 239/88–93, 239/533.2, 533.3, 533.12, 585.1–585.5, 124, 239/127; 251/129.15, 129.21, 127
See application file for complete search history.

(56) References Cited

U.S. PATENT DOCUMENTS

| | | | | |
|---|---|---|---|---|
| 4,759,330 | A * | 7/1988 | Kato et al. | 123/446 |
| 5,301,875 | A * | 4/1994 | Gant et al. | 239/94 |
| 5,472,142 | A * | 12/1995 | Iwanaga | 239/96 |
| 5,893,516 | A * | 4/1999 | Harcombe et al. | 239/95 |
| 6,085,726 | A | 7/2000 | Lei et al. | |
| 6,227,175 | B1 | 5/2001 | Jiang et al. | |

FOREIGN PATENT DOCUMENTS

EP 1 359 316 A3 12/2003

* cited by examiner

*Primary Examiner*—Davis Hwu
(74) *Attorney, Agent, or Firm*—Brooks Kushman P.C.

(57) ABSTRACT

A fuel injector regulator having combined initial injection and peak injection pressure regulation. The fuel injector regulator includes a rate shaping valve movably supported within a valve bore between a closed position and an open position to regulate a rate of injected fuel. The regulator further includes a waste gate valve having a body movably supported within a bore of the rate shaping valve and between a closed position and an open position to regulate the pressure of injected fuel.

20 Claims, 5 Drawing Sheets

FUEL INJECTOR REGULATOR HAVING COMBINED INITIAL INJECTION AND PEAK INJECTION PRESSURE REGULATION

BACKGROUND OF THE INVENTION

1. Field of the Invention

The present invention relates to fuel injector assemblies having a combined initial injection and peak injection pressure regulator.

2. Background Art

A fuel injector assembly having a combined initial injection and peak injection pressure regulator addresses a need in the art for a fuel injector assembly system which may be employed to lower the initial rate of fuel injection and to limit peak injection pressure in a simple, inexpensive and cost-effective manner.

One short-coming with such regulators is with the precision at which it can control a waste gate valve to control the valve's opening and closing pressure. The disadvantage is due to a differential in surface area of the waste gate valve being exposed to high pressure fuel when the valve is closed that is substantially less than a surface area exposed to the fuel when the valve is opened. This surface area differential causes a correspondingly differential in opening and closing pressure that prevents the waste gate valve from controlling its open and closing pressure with desired precision.

Accordingly, there exists a need to provide a fuel injector assembly which can more closely control the opening and closing pressures of a waste gate valve.

SUMMARY OF THE INVENTION

It is, therefore, an object of the present invention to provide a fuel injector assembly that can closely control an opening and closing pressure of a waste gate valve used to provide injection pressure regulation.

One aspect of the present invention relates to a fuel injector assembly for an internal combustion engine. The assembly includes an injector body and a nozzle assembly in fluid communication with a source of fuel for dispersing fuel during an injection event.

A regulator can be included within the assembly for regulating an initial injection and peak injection pressure of the fuel dispersed by the nozzle assembly. A biasing spring can be included to control the opening and closing of the regulator. In one aspect of the present invention, the pressure regulator includes a housing having a valve bore and an inlet for fluid communication between the fuel system and the valve bore.

A rate shaping valve is movably supported within the valve bore between a closed position and an open position to regulate the initial injection pressure. The rate shaping valve can include a waste gate valve bore and an inlet for fluid communication between the fuel system and the waste gate valve bore.

A waste gate valve having a body can be movably supported within the waste gate bore between a closed position and an open position to regulate the peak injection pressure. In one aspect of the present invention, the waste gate valve body can be cylindrically shaped along an entire axial length of the waste gate valve body. In the closed and opened valve position, this particular shaping limits a change in surface area exposed to incoming fluid, and thereby, limits the differential in opening and closing pressures.

In another aspect of the present invention, the waste gate body can be characterized as including first and second portions. The first portion corresponds with the portion of the body in fluid communication with the fuel delivery system when the waste gate valve is closed, and the second portion corresponds with the portion of the body in fluid communication with the fuel delivery system when the waste gate valve is open. Preferably, the waste gate body can be shaped such that the area of the lower portion is less than 5%-10% larger than the area of the upper portion so that a difference between the opening and closing pressure of the waste gate body is relatively small. In addition, the waste gate body can be shaped such that all cross-sectional portions are perpendicular to a center axis of the body, and optionally such that all the cross-sectional portions provide a uniform diameter along an entire axial length of the body.

DETAILED DESCRIPTION OF THE PREFERRED EMBODIMENT(S)

Figure 1:
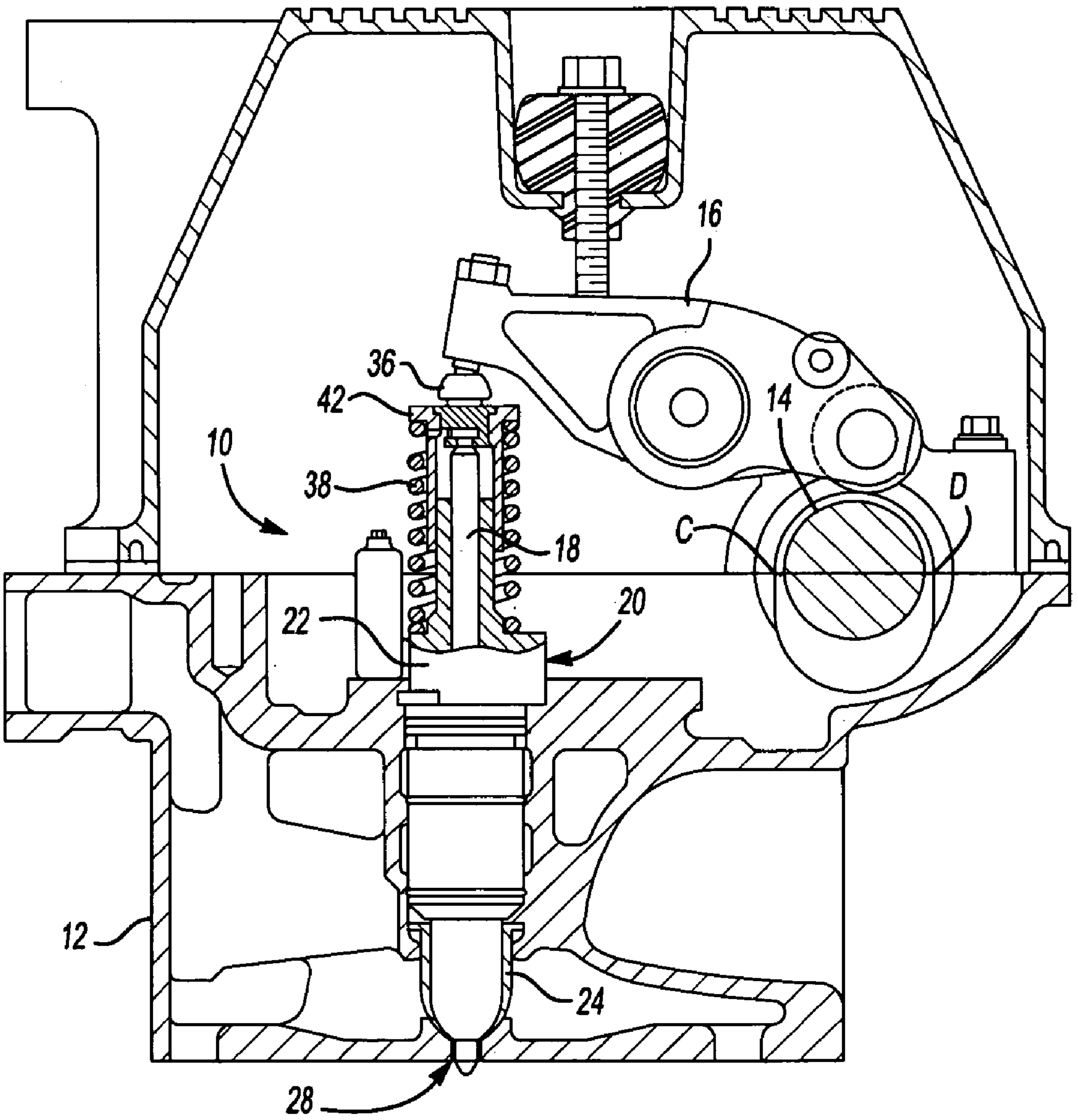
FIG. 1 is a cross-sectional side view of a fuel injector supported in a cylinder head and actuated by cam driven rocker arm.

FIG. 1 illustrates fuel injector assembly 10 for an internal combustion engine. The injector assembly 10 is shown in a typical environment supported by cylinder head 12 and adapted to inject fuel into a cylinder of the internal combustion engine. The fuel is combusted to generate power to rotate a crankshaft. Cam 14 is rotated to drive rocker arm 16, which in turn, actuates plunger 18 supported for reciprocation by the injector assembly 10. Alternatively, an engine driven cam may be employed to actuate the plunger 18 directly as is commonly known in the art. Movement of plunger 18 acts to increase the fuel pressure within injector assembly 10. Fuel is ultimately injected by assembly 10 into cylinder at high pressure as will be described in greater detail below.

Figure 2:
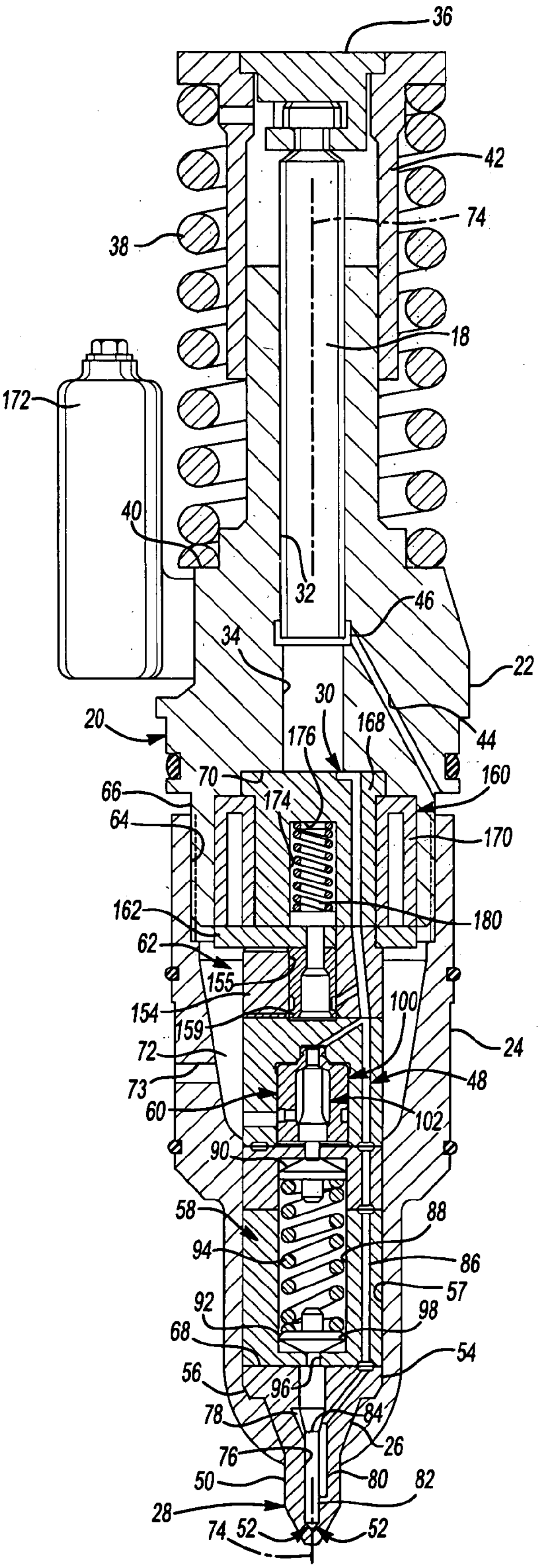
FIG. 2 is a cross-sectional side view of a fuel injector assembly of the present invention.

FIG. 2 is a more detailed illustration of fuel injector assembly 10 according to the present invention. Assembly 10 is shown in cross-section and includes vertically extending injector body 20 in fluid communication with a source of fuel. The injector body 20 includes bushing 22 and nut 24 threaded to the lower end of the bushing 22 and which forms extension thereof. Nut 24 has opening 26 at its lower end through which extends the lower end of nozzle assembly 28.

Fuel is dispersed from nozzle assembly 28 during an injection event as will be described in greater detail below.

Injector assembly 10 also includes high pressure fuel delivery system 30, which serves to provide fuel at high pressure to nozzle assembly 28. High pressure fuel delivery system 30 includes cylindrical bore 32 formed in bushing 22. Plunger 18 is slidably received by cylindrical bore 32. Together, plunger 18 and cylindrical bore 32 define pump chamber 34. Plunger 18 extends out one end of the bushing 22 and is topped by cam follower 36. Return spring 38, supported between shoulder 40 formed on bushing 22 and plunger spring retainer 42, serves to bias plunger 18 to its fully extended position. A stop hook (not shown) extends through upper portion of injector body 20 to spring retainer 42 to limit upward travel of plunger 18 induced the bias of the return spring 38.

Low pressure fuel is supplied to the assembly 10 from fuel rail or the like through fuel feed passage 44 formed in the bushing 22. Fuel feed passage 44 communicates with pump chamber 34 via inlet port 46. In addition, high pressure fuel delivery system 30 further includes high pressure fuel passage 48, which extends through the injector body 20 from the pump chamber 34 to the nozzle assembly 28.

Nozzle assembly 28 includes spray tip 50 having at least one, but preferably plurality of, apertures 52 through which fluid is dispersed from assembly 28. Spray tip 50 is enlarged at its upper end to provide shoulder 54 which seats on internal shoulder 56 provided by counter-bore 57 in nut 24. Between the spray tip 50 and the lower end of the injector body 20, there is positioned above nozzle assembly 28, in sequence starting from the spray tip 50, biasing member 58, combined initial injection and peak injection pressure regulator 60 and solenoid operated check valve 62. As illustrated in these figures, these elements are formed as separate parts for ease of manufacturing and assembly. Nut 24 is provided with internal threads 64 for mating engagement with internal threads 66 at the lower end of injector body 20. The threaded connection of nut 24 to injector body 20 holds spray tip 50, biasing member 58, pressure regulator 60 and solenoid operated check valve 62 clamped and stacked end to end between upper face 68 of spray tip 50 and bottom face 70 of bushing 22. All of these above-described elements can have lapped mating surfaces whereby they are held in pressure sealed relation to each other.

Injector body 20 has longitudinal axis 74 which defines the centerline thereof. Plunger 18, pressure regulator 60, check valve 62 and nozzle assembly 28 are each disposed axially along this centerline. In addition, nut 24 defines low pressure fuel spill gallery 72 in which unused fuel is collected from fuel delivery system 30. Fuel exits the injector body 20 via fuel return port 73 formed in nut 24 adjacent the spill gallery 72. Spill gallery 72 and the high pressure fuel passage 48 are laterally spaced from, and can be specifically located on, opposite sides of the centerline within the injector body 20.

Nozzle assembly 28 includes nozzle bore 76 formed in spring tip 50 along the centerline of injector body 20. Bore 76 is in fluid communication with high pressure fuel passage 48 and defines injection cavity 78. Nozzle assembly 28 also includes needle valve 80 which is movably supported within nozzle bore 76 in response to fuel pressure between a closed position, wherein no fuel is dispersed from the nozzle assembly 28 and an open position wherein fuel is dispersed from the nozzle tip 50 through aperture 52 when the pressure in nozzle bore 76 exceeds a predetermined needle opening pressure. Accordingly, needle valve 80 has tip portion 82 and valve portion 84 which is complementarily received within injection cavity 78. Tip portion 82 is adapted to close the apertures 52 when the pressure in fuel delivery system 30 is below the needle closing pressure. On the other hand, needle valve 80 is responsive to the pressure acting on valve portion 84 within the injection cavity 78 to move to its open position, thereby dispersing fuel from injector 10 through apertures 52. Biasing member 58 biases needle valve 80 to its closed position with predetermined force such that the needle valve 80 moves to its open position only after the pressure from the fuel delivery system 30 acting within injector cavity 78 has reached the needle opening pressure.

Biasing member 58 includes spring cage 86 supported at one end in abutting contact with upper face 68 of spray tip 50. Spring cage 86 has spring chamber 88 formed therein. Within spring chamber 88 there is upper retainer 90 and lower retainer 92, spaced apart from one another. Coiled spring 94 extends between two retainers 90, 92 so as to bias them in opposite directions with predetermined force. Spring cage 86 includes lower aperture 96 corresponding to lower retainer 92 and extending between spring chamber 88 and nozzle bore 76. Needle valve 80 also includes head 98 which is disposed opposite tip portion 82. Head 98 is received through lower aperture 96 and is engaged by lower retainer 92. Thus, lower retainer 92 translates the predetermine force to needle valve 80 to bias it to its closed position.

As noted above, combined initial injection and peak injection pressure regulator 60 is disposed immediately above biasing member 58. Pressure regulator 60 is operable to control nozzle assembly 28 to regulate the rate of fuel injection at the beginning of injection event. In addition, pressure regulator 60 is also operable to limit the maximum pressure of the fuel dispersed from nozzle assembly 28. To that end, injection pressure regulator 60 is movably supported between closed position and two open positions: (1) first open position which reduces the rate of fuel injection at the beginning of the injection event; as well as (2) second open position which limits the maximum pressure of the fuel dispersed by nozzle assembly 28. Pressure regulator 60 is also adapted to provide short burst of pilot fuel injected at the beginning of the injection event when it is moved to the first open position. Biasing member 58 biases injection pressure regulator 60 to its closed position with predetermined force such that injection pressure regulator 60 moves to its first open position only after the pressure in the fuel delivery system 30 has reached a predetermined first opening pressure. Furthermore, biasing member 58 acts such that injection pressure regulator 60 moves to its second open position only after the pressure in fuel delivery system 30 has reached a predetermined second opening pressure.

Figure 3:
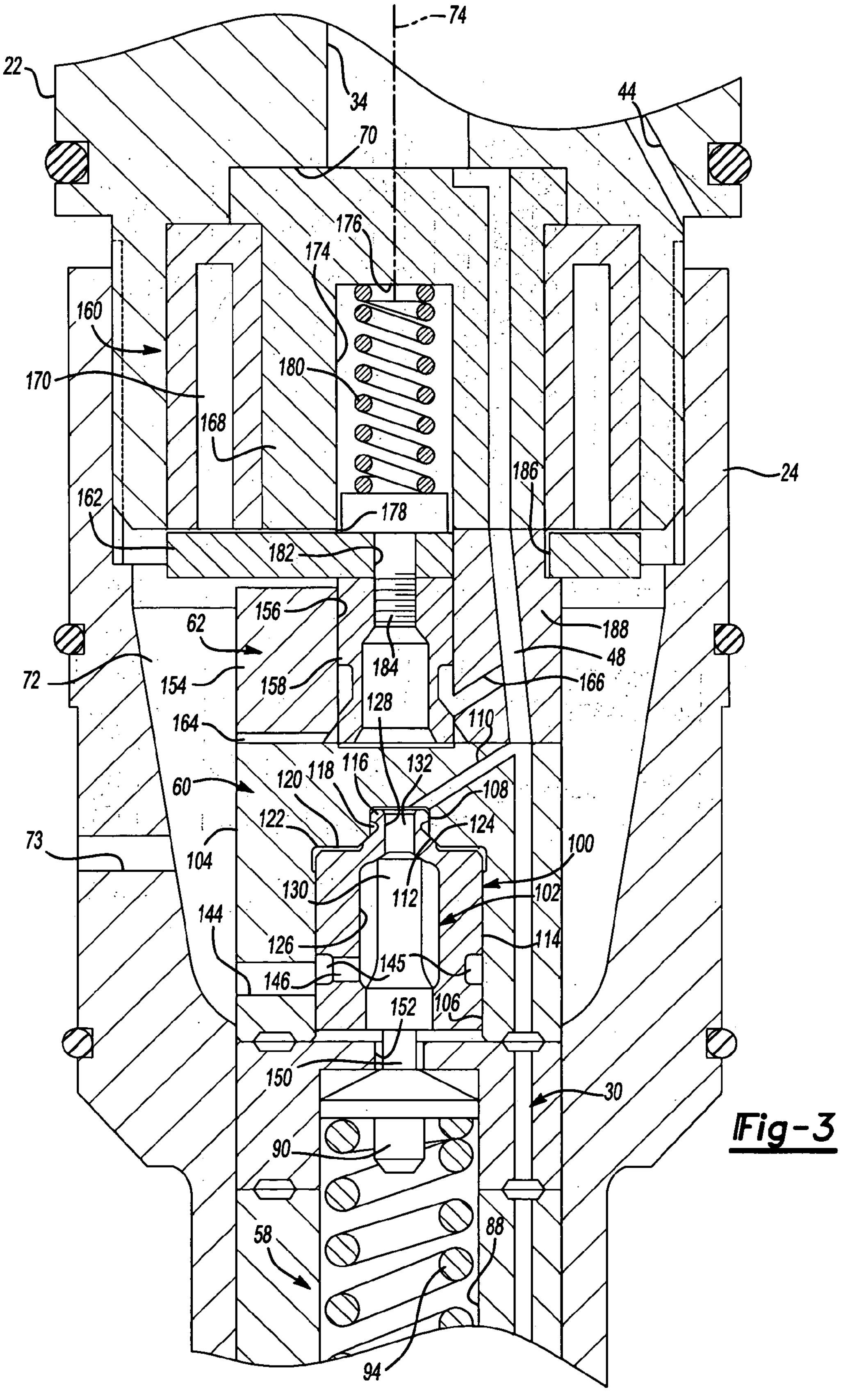
FIG. 3 is an enlarged, partial cross-sectional side view of the fuel injector illustrating the combined initial injector and peak injector pressure regulator of the present invention.
Figure 4:
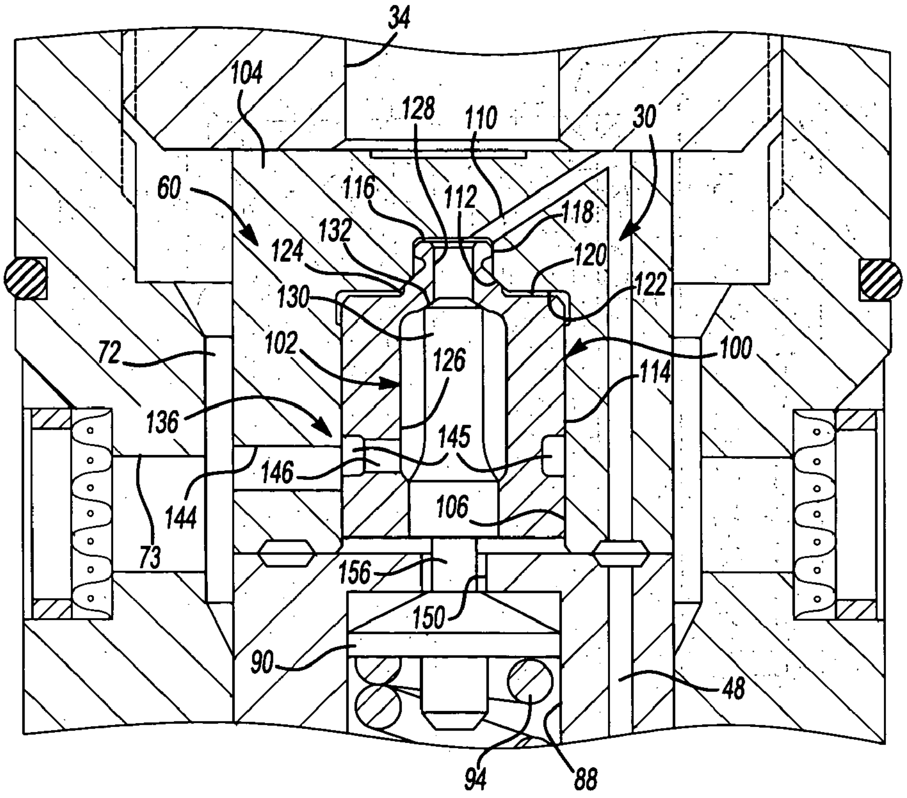
FIG. 4 is an enlarged, partial cross-sectional side view of an alternative embodiment of a fuel injector employing the combined initial injection and peak injection pressure regulator of the present invention.
Figure 5:
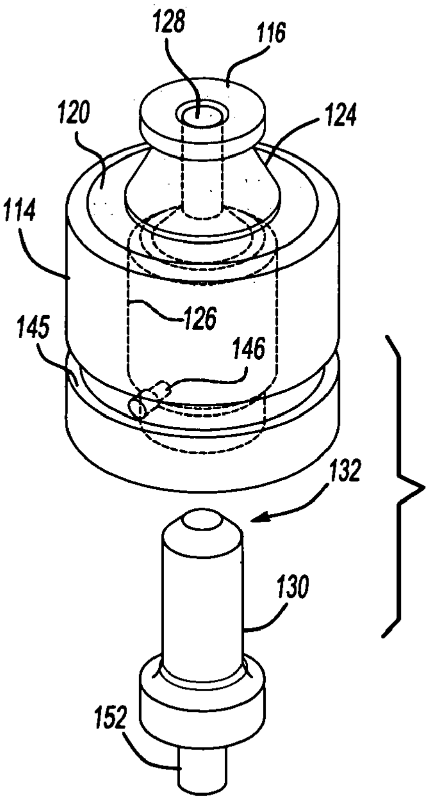
FIG. 5 is an exploded illustrating the rate shaping valve member and waste gate valve member of the present invention.
Figure 6:
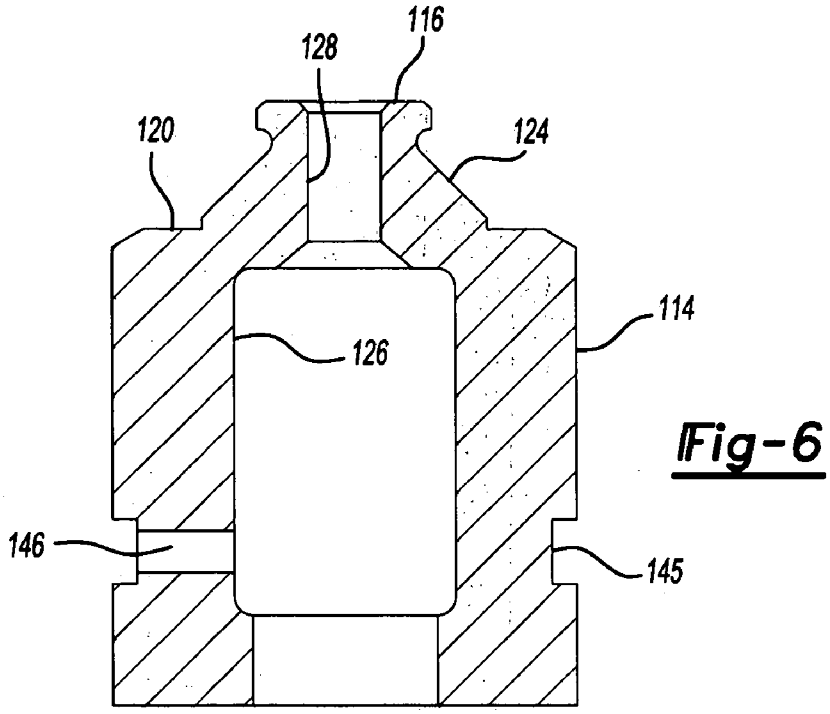
FIG. 6 is a cross-sectional side view of the rate shaping valve member of the present invention.

Referring now to FIGS. 3 through 8, combined initial injection and peak injection pressure regulator 60 includes rate shaping valve 100 and waste gate valve 102. Injection pressure regulator 60 includes housing 104 having valve bore 106 defining a first, larger diameter and inlet 108 defining a second, smaller diameter labeled A in FIG. 4. Inlet 108 provides fluid communication between fuel delivery system 30 and valve bore 106 via short conduit 110. Alternatively, inlet 108 may be in direct fluid communication with pump chamber 34, wherein check valve 62 would be located elsewhere on injector body 20. Otherwise, fuel injector assembly 10 illustrated in FIG. 4 is substantially identical in all important respects to that illustrated in FIGS. 2 and 3. Housing 104 also includes valve seat 112 which is defined between inlet 108 and valve bore 106.

Rate shaping valve 100 includes precision machined cylindrical body 114 complementarily received within valve bore 106 to prevent any leakage of pressurized fluid between the body 114 and the bore 106. Rate shaping valve 100 also includes pintle head 116 extending from body 114 and which is adapted to be received in inlet 108 so as to define predetermined annual clearance 118 therebetween. Thus, annular clearance 118 is formed by the dimensional difference between the diameter A of the inlet 108 and the diameter of pintle head 116. In addition, annular shoulder 120 is formed between body 114 and pintle head 116. Valve chamber 122 is defined between annular shoulder 120 and valve bore 106. Rate shaping valve 100 also includes frusto-conical portion 124 formed between pintle head 116 and annular shoulder 120 which cooperates with valve seat 112.

Rate shaping valve 100 is movably supported within valve bore 106 from a closed position to an open position in response to fuel pressure in fuel delivery system 30 acting on pintle head 116. In its open position, fuel flows past pintle head 116 and frusto-conical portion 124, through annular clearance 118, and into valve chamber 122. This reduces the rate of fuel dispersed from nozzle assembly 28 by reducing the pressure of the fuel at the beginning of the injection event.

Rate shaping valve 100 may also be configured to provide short pilot injection of fuel into the cylinder. In the case of pilot injection, needle valve 80 initially opens to allow short pre-injection of fuel. Annular clearance 118 is of sufficient size that fuel flow into valve chamber 122 reduces the system fuel pressure such that it falls below the needle opening pressure. Needle valve 80 is then closed until the fuel pressure in delivery system 30 again rises above the needle opening pressure. However, rate shaping valve 100 remains in its open position because the pressure required to keep it open (i.e., system pressure acting on both pintle head 116 and shoulder 120) is less than required to move it to its open position (i.e., the pressure acting on the pintle head 116 alone). In either event, rate shaping valve 100 functions to reduce the maximum combustion temperature and thus NOx formation. Biasing member 58 biases rate shaping valve 100 to its closed position with predetermined force such that rate shaping valve 100 moves to its open position only after the pressure in fuel delivery system 30 has reached predetermined rate shape valve opening pressure.

As best shown in FIGS. 4 through 8, body 114 of rate shaping valve 100 also serves as housing for waste gate valve 102. Accordingly, housing 114 has waste valve bore 126 which defines a first, larger diameter. In addition, waste gate housing 114 includes inlet 128 defining a second, smaller diameter labeled B in FIG. 4.

Waste gate valve 102 includes precision machined, substantially cylindrical body 130 complementarily received within waste valve bore 126 and head 132 which is adapted to be received within inlet 128 corresponding with a diameter B. In addition, waste fuel passage system 136 provides fluid communication between waste valve bore 126 and fuel spill gallery 72.

Waste fuel passage system 136 also includes at least one connecting passage 144 which extends through the injection pressure regulator housing 104 and provides fluid communication between fuel spill gallery 72 and rate shaping valve bore 106. In addition, at least one, but preferably plurality of, shunt passages 146 extends through waste gate housing 114 and correspond to annular groove 145 formed about the lower portion of the rate shaping valve body 114. Annular groove 145 corresponds to connecting passage 144 thereby providing fluid communication between the connecting passage 144 and shunt passages 146.

As noted above, biasing member 58 biases injection pressure regulator 60 to its closed position. To this end, upper spring retainer 90 translates predetermined force to injection pressure regulator 60 though waste gate valve 102 to bias regulator 60 to its closed position. More specifically, spring chamber 88 includes upper aperture 150 which corresponds to upper retainer 90 and extends between spring chamber 88 and waste valve bore 126. Waste gate valve body 130 includes tail 152 received through upper aperture 150 and which is engaged by upper retainer 90 to bias waste gate valve 102 and, ultimately, combined initial injection and peak injection pressure regulator 60 to its closed position.

Inlet 128 provides fluid communication between fuel delivery system 30 and waste valve bore 126. Waste gate valve 102 is co-axial relative to rate shaping valve 100 as well as axis 74 of the injector assembly 10. Further, waste gate valve 102 is movably supported within waste valve bore 126 (i.e. within rate shaping valve body 114) from closed position to open position in response to fuel pressure in fuel delivery system 30. In its open position, waste gate valve 102 provides fluid communication between fuel delivery system 30 and fuel spill gallery 72. When the waste gate valve 102 is open, fuel pressure in the fuel delivery system 30 is dramatically reduced. Waste gate valve 102 therefore serves to limit the peak pressure in the fuel delivery system 30 and thus the peak injection pressure. The peak system and injection pressures can be engineered by controlling the size of inlet 128 of the waste gate valve 102. The larger inlet 128, the lower the peak system and injection pressures of the injector assembly 10.

In the embodiments disclosed herein, single biasing member 58 is employed to bias both needle valve 80 to its closed position as well as bias combined initial injection and peak injection pressure regulator 60 (i.e., both rate shaping valve 100 and waste gate valve 102) to its closed position. However, those having ordinary skill in the art will appreciate that one biasing member may be employed and dedicated to needle valve 80 while separate biasing member may be dedicated to bias the pressure regulator 60. Additionally, separate biasing members may be used for each of rate shaping valve 100 and waste gate valve 102.

As shown in FIGS. 2 and 3, solenoid operated check valve 62 may be located between the pump chamber 34 and nozzle assembly 28 and between low pressure fuel spill gallery 72 and high pressure fuel passage 48. More specifically, check valve 62 may be located just above the combined initial injection and peak injection pressure regulator 60 and beneath pump chamber 34. Check valve 62 is operable to control the pressure in the fuel delivery system 30. To this end, check valve 62 is movable between open position, wherein fluid communication is established between the high pressure fuel passage 48 and low pressure spill gallery 72 thereby reducing the pressure in fuel delivery system 30 to closed position interrupting communication between high pressure fuel passage 48 and low pressure spill gallery 72 thereby increasing the pressure in fuel delivery system 30. Closure of check valve 62 and increasing the pressure in fuel delivery system 30 facilitates the delivery of fuel at high pressure from the pump chamber 34 to nozzle assembly 28.

Check valve 62 includes valve housing 154 having valve bore 156 and valve member 158 movably supported therein. solenoid assembly 160, is mounted adjacent housing 154. Armature 162 electromagnetically interconnects valve 158 and solenoid assembly 160 and acts to move valve 158 between its open and closed positions. A very short conduit 164 extends within housing 154 between valve bore 156 and fuel spill gallery 72. In addition, connecting port 166 extends within the housing 154 between valve bore 156 and high pressure fuel passage 48.

Solenoid assembly 160 includes pole piece 168 and coil 170 wound about pole piece 168. Coil 170 is electrically connected to terminal 172 (shown in FIG. 2) which, in turn, is connected to source of electrical power via fuel injection electronic control module. Pole piece 168 includes bore 174 having blind end 176 and air gap 178 which faces armature 162. Coiled spring 180 is captured within bore 174 and between blind end 176 and armature 162 to bias valve 158 to its normally opened position. Armature 162 includes opening 182 which is aligned with bore 174 in pole piece 168. Fastener 184 extends through opening 182 and interconnects armature 162 with valve 158. Valve 158 is moved upwardly and check valve 62 is closed when coil 170 is energized to generate magnetic flux which acts on armature 162.

In the embodiment illustrated in FIGS. 2 and 3, valve housing 154 includes stepped portion 188 loosely received in channel 186 so as to accommodate movement of armature 182 but adapted for sealed abutting contact with pole piece 168. Thus, high pressure fuel passage 48 may extend through pole piece 168 and valve housing 154 through stepped portion 188.

In operation, low pressure fuel is supplied to assembly 10 from fuel rail or the like through fuel feed passage 44. Fuel enters pump chamber 34 via inlet port 46 when plunger 18 is at its fully extended or rest position under the biasing influence of return spring 38 as shown in FIG. 2. As illustrated in FIG. 1, cam 14 is designed so that the duration of its total lift section (between points C and D) is about 180° of turning angle. Plunger 18 is driven downward by the cam lobe via rocker arm 16 from its rest position to its maximum lift (or lowest position) and then back to the rest position in the first half turn of cam rotation. Plunger 18 stays at its top, rest position for the remaining half turn of cam rotation. When cam 14 rotates such that the lobe actuates rocker arm 16, plunger 18 is driven downward and inlet port 46 is closed by the plunger 18. Downward movement of the plunger 18 increases the pressure in the fuel delivery system 30 to maximum at maximum plunger lift.

Solenoid operated check valve 62 is normally held in its open position with valve member 158 unseated under the biasing influence of coiled spring 180. In this disposition, fuel delivery system 30 is in fluid communication with low pressure fuel spill gallery 72 via short connecting port 166 and short conduit 164. Accordingly, fuel delivery system 30 is vented to the low pressure side and high injection pressures cannot be developed in the injector.

However, the operation of check valve 62 is controlled by engine control module or some other control device. More specifically, during the downward stroke of plunger 18, solenoid assembly 160 may be powered to generate electromagnetic force. The force attracts armature 162 toward solenoid assembly 160 which, in turn, moves valve member 158 against the biasing force of spring 180 to its closed position thereby interrupting communication between fuel delivery system 30 and fuel spill gallery 72 via the check valve 62. Fuel delivery system 30 is then pressurized by the pumping action of plunger 18 during its downward stroke.

Combined initial injection and peak injection pressure regulator 60 is normally closed by biasing force of coiled spring 94 acting through the tail 152 of waste gate valve 102. However, rate shaping valve 100 is responsive to the pressure in the fuel delivery system 30 acting over the area A of inlet 108. Similarly, nozzle assembly 28 is normally closed by the biasing force of coiled spring 94 acting through head 98 of needle valve 80. Needle valve 80 is responsive to system pressure acting in injection cavity 78 against valve portion 84 to move needle valve 80 to its open position. The fuel injection event then begins.

When the system pressure exceeds the rate shaping valve opening pressure, the rate shaping valve body 114 moves within bore 106 against the biasing force of coiled spring 94 to its open position over distance $L_1$ as noted in FIG. 4. Accordingly, the rate shaping valve opening pressure is defined by the area A of inlet 108 and the preload of spring 94 and referred to as a first opening pressure. When rate shaping valve 100 is open, pressurized fluid then flows from inlet 108 into the valve chamber 122. The rate of fuel flow to valve chamber 122 is determined by the cross-sectional area of annular clearance 118 defined between the inlet 108 and head 116. A larger annular clearance 118 causes greater amount of pressurized fluid to flow rapidly into flow chamber 122. This results in sharp system pressure drop. Annular clearance 118 may be designed such that the system pressure drops below the needle closing pressure. If so, needle valve 80 falls back to its seat resulting in initial pilot injection of small quantity of fuel into the combustion chamber of the engine.

Meanwhile, plunger 18 continues its downward movement and the needle valve 80 opens again after the system pressure has once again reached the needle opening pressure. However, rate shaping valve 100 remains open even during the initial pressure drop because the pressure required to keep it open is less than required to initially open the rate shaping valve.

Figure 8:
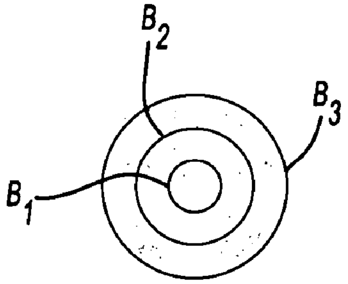
FIG. 8 is a top view of the waste gate valve member of the present invention.
Figure 7:
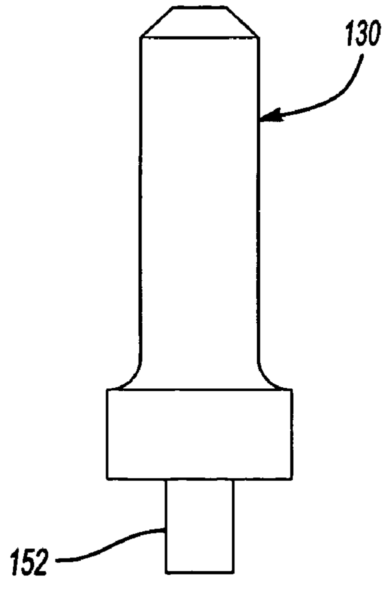
FIG. 7 is a cross-sectional side view of the waste gate valve member of the present invention.

Alternatively, smaller annular clearance 118 provides fuel flow at lower rate to valve chamber 122. This results in less of injection pressure drop. Moreover, annular clearance 118 and the lift $L_1$ of rate shaping valve 100 may be engineered such that there is no pilot injection, but rather the overall initial injection rate is merely reduce. Various combinations of initial injection rate shape can be created by modifying the geometry of the annular clearance 118 and the rate shaping valve lift $L_1$ to provide for pilot injection, lower the initial rate of injection, yield lower maximum combustion temperatures and lower $NO_x$ emissions.

Where high velocity injection cam is used or the diameter of the plunger is specified so as to generate high injection pressures at lower engine speed or load, the system pressures generated at high engine speed or high load may test the integrity of the injector, cause failure or lead to premature wear. Accordingly, pressure regulator 60 of the present invention further includes waste gate valve 102. In response to predetermined, elevated system pressure, waste gate valve body 130 moves to its open position over distance indicated as $L_2$ in FIG. 2 and against the biasing force of coiled spring 94 acting on body 130 through its tail 152. The waste gate valve opening pressure is defined by the area $B_1$ plus $B_2$ of inlet 128 and total load on the coil spring 94. The area $B_1$ plus $B_2$ is shown in FIG. 8 and corresponds with a second opening pressure. The second opening pressure must be greater than the sum of the initial spring load and the load due to the rate shape valve lift $L_1$. If it is then pressurized fuel flows into waste fuel passage system 136 through shunt passages 146 to annular groove 145 in the lower portion of the rate shaping valve body 114 and into fuel spill gallery 72 via connecting passage 144. The area $B_1$ plus $B_2$ and the waste gate valve lift $L_2$ define the spill rate of the pressurized fuel. High pressure fuel delivery system 30 is thus vented to low pressure spill gallery 72 resulting in limitation of the maximum pressure which can be developed in the assembly 10.

If the pressure in fuel delivery system 30 drops below the second opening pressure, waste gate valve 102 can be closed if the pressure is less than the biasing force of biasing member 58. This closing of waste gate valve 102 corresponds with a first closing pressure of valve 102.

The difference in pressure between the second opening pressure and the first closing pressure is proportional to the surface area of the valve body 130 exposed to the incoming fuel. As shown in FIG. 8, a first portion of valve body 130 corresponds with areas $B_1$ and $B_2$ to reference the portion of valve body 130 which is in fluid communication with fuel delivery system 30 when waste gate valve 102 is closed. When waste gate valve 102 is opened, in addition to $B_1$ and $B_2$, surface area $B_3$ fluidly communicates with fuel delivery system 30. To close the opened valve 102, the closing pressure must be less than the second opening pressure due to the increased surface area of $B_3$ now being in fluid communication with fuel delivery system 30.

One object of the present invention is to closely control the differential between the second opening pressure and the closing pressure of waste gate valve 102. To due so, the differential in exposed surface area from the closed to the open position is preferably less than 10% to closely control the differential between the second opening pressure and the first closing pressure. In another aspect of the present invention waste gate body can be cylindrically shaped along its entire axial length to reduce its cost of manufacturing and improve system cost deficiency. This cylindrical shaping is intended to cover cone-shaped and non-uniform diameter structures, wherein each discrete cross-section is cylindrical. This can be done by shaping body 130 such that all cross-sectional portions perpendicular to a center axis of body 130 have a uniform diameter. Valve body 130 shown in FIG. 8 includes such cross-sectional portions, even though some of the portions may have differing diameters. In accordance with another aspect of the present invention, waste gate body 130 can include a uniform diameter allowing its entire axial length to further simplify the cost of manufacturing and to eliminate any differential of area on waste gate body 130 which is exposed to fluid delivery system 30 in its open and close positions to form a cylindrical body having a single diameter. This diameter is preferably greater than the diameter of inlet 128 and less than the largest diameter of shoulder 112 of valve bore 106 such that there is a slight, if any, differential in areas exposed to fluid delivery system 30 when valve 102 is opened and closed. Accordingly, a differential in area would need to be closely controlled in order to control the differential pressure between the second opening pressure and the first closing pressure.

At the end of the injection event, solenoid assembly 160 is de-energized, valve member 158 is biased to its open position under the influence of coiled spring 180 and high pressure fuel delivery system 30 is completely vented to low pressure fuel spill gallery 72. Needle valve 80 reseats under the influence of the coiled spring 94 and the process is repeated.

Accordingly, the fuel injector assembly 10 of the present invention provides for combined initial injection and peak injection pressure regulator 60 which is operable to control the nozzle assembly 28 to regulate the rate of fuel injection at the beginning of injection event. More specifically, regulator 60 is operable to provide for initial, pilot injection, and/or reduce the initial rate of fuel injection. Furthermore, pressure regulator 60 may be tuned such that various combinations of initial injection rate shape can be created thereby lowering the maximum combustion temperature and lowering $NO_x$ emissions. In addition, pressure regulator 60 is further operable to limit the maximum pressure of the fuel dispersed from the nozzle assembly 28. Thus, the pressure regulator is especially adapted for use in conjunction with injectors where high injection pressures are desired at lower engine speed and load. Pressure regulator 60 thus effectively addresses the issue of liability and durability in these environments. The above features and advantages are further achieved in simple, cost-effective and efficient pressure regulator which is elegantly simple and not overly mechanically complex.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fuel injector assembly for an internal combustion engine, comprising:

- an injector body in fluid communication with a source of fuel;
- a nozzle assembly in fluid communication with the injector body and operable for dispersing fuel during an injection event;
- a high pressure fuel delivery system providing high pressure fuel to the nozzle assembly; and
- a regulator in fluid communication with the nozzle assembly and operable to regulate the rate and pressure of the dispersed fuel; the pressure regulator including:
  - a housing having a valve bore and an inlet for fluid communication between the fuel system and the valve bore;
  - a rate shaping valve movably supported within the valve bore between a closed position and an open position to regulate the rate of injected fuel, the rate shaping valve having a waste gate valve bore and an inlet for fluid communication between the fuel system and the waste gate valve bore; and
  - a waste gate valve having a body movably supported within the waste gate bore between a closed position and an open position to regulate the pressure of the injected fuel, the waste gate valve body being cylindrically shaped along an entire axial length of the waste gate valve body.

2. The assembly of claim 1 wherein the cylindrically body is characterized by all cross-sectional portions perpendicular to a center axis of the body having a uniform diameter.

3. The assembly of claim 1 wherein the waste gate body includes a uniform diameter along the entire axial length.

4. The assembly of claim 3 wherein the diameter is greater than the inlet and less than the valve bore.

5. The assembly of claim 1 further comprising a biasing member supported within the assembly and operable for biasing the regulator to a closed position with a predetermined force such that the regulator moves to a first open position only after the pressure in said fuel delivery system has reached a predetermined first opening pressure and such that the regulator moves to a second open position only after the pressure in said fuel delivery system has reached a predetermined second opening pressure, wherein the waste gate body includes a first portion having a surface area in communication with the fluid delivery system in the closed and opened positions and a second portion having a surface area in communication with the fuel delivery system only in the opened position, the first opening pressure corresponding with the rate shaping valve opening, the second opening pressure corresponding with the waste gate body moving to the opened position if the fluid pressure acting on the first portion is greater than the biasing force of the biasing member, a first closing pressure corresponding with moving the waste gate body to the closed position after being moved to the opened position if the fluid pressure acting on the first and second portions is less than the biasing force of the biasing member, the waste gate body being shaped such that the surface area of the second portion is less than 10% larger than the surface area of the first portion so that a difference between the opening and closing pressure of the waste gate body is relatively small.

6. The assembly of claim 1 further comprising a biasing member supported within the assembly and operable for biasing the regulator to a closed position with a predetermined force such that the regulator moves to a first open position only after the pressure in said fuel delivery system has reached a predetermined first opening pressure and such that the regulator moves to a second open position only after the pressure in said fuel delivery system has reached a predetermined second opening pressure, the first opening pressure corresponding with the rate shaping valve opening, the second opening pressure corresponding with the waste gate body moving to the opened position, a first closing pressure corresponding with moving the waste gate body to the closed position after being moved to the opened position, the waste gate body being shaped such that a difference between the opening and closing pressure of the waste gate body is less than 10%.

7. A method for manufacturing a fuel injector assembly, the method comprising:

- providing an injector body in fluid communication with a source of fuel;
- providing a nozzle assembly in fluid communication with the injector body and operable for dispersing fuel during an injection event;
- providing a high pressure fuel delivery system for providing high pressure fuel to the nozzle assembly; and
- providing a regulator in fluid communication with the nozzle assembly and operable to regulate the rate and pressure of the dispersed fuel, the pressure regulator including:
  - a housing having a valve bore and an inlet for fluid communication between the fuel system and the valve bore;
  - a rate shaping valve movably supported within the valve bore between a closed position and an open position to regulate the rate of injected fuel, the rate shaping valve having a waste gate valve bore and an inlet for fluid communication between the fuel system and the waste gate valve bore; and
  - a waste gate valve having a body movably supported within the waste gate bore between a closed position and an open position to regulate the pressure of the injected fuel, the waste gate valve body being shaped such that a pressure difference associated with moving the waste gate body to the closed position after being moved to the opened position is relatively small.

8. The method of claim 7 further comprising cylindrically shaping the waste gate body along an entire axial length of the waste gate valve body.

9. The method of claim 8 wherein shaping the cylindrically body is characterized by all cross-sectional portions perpendicular to a center axis of the body having a uniform diameter.

10. The method of claim of claim 7 wherein shaping the waste gate body is characterized by a uniform diameter along the entire axial length.

11. The method of claim of claim 10 wherein the diameter is shaped to be greater than the inlet and less than the valve bore.

12. The method of claim of claim 7 further comprising providing a biasing member supported within the assembly and operable for biasing the regulator to a closed position with a predetermined force such that the regulator moves to a first open position only after the pressure in said fuel delivery system has reached a predetermined first opening pressure and such that the regulator moves to a second open position only after the pressure in said fuel delivery system has reached a predetermined second opening pressure, and providing the body with a first portion having a surface area in communication with the fluid delivery system in the closed and opened positions and a second portion having a surface area in communication with the fuel delivery system only in the opened position, the first opening pressure corresponding with the rate shaping valve opening, the second opening pressure corresponding with the waste gate body moving to the opened position if the fluid pressure acting on the surface area of the first portion is greater than the biasing force of the biasing member, a first closing pressure corresponding with moving the waste gate body to the closed position after being moved to the opened position if the fluid pressure acting on the surface areas of the first and second portions is less than the biasing force of the biasing member, the waste gate body being shaped such that the surface area of the second portion is less than 10% larger than the surface area of the first portion so that a difference between the opening and closing pressure of the waste gate body is relatively small.

13. The method of claim of claim 7 further comprising providing a biasing member supported within the assembly and operable for biasing the regulator to a closed position with a predetermined force such that the regulator moves to a first open position only after the pressure in said fuel delivery system has reached a predetermined first opening pressure and such that the regulator moves to a second open position only after the pressure in said fuel delivery system has reached a predetermined second opening pressure, the first opening pressure corresponding with the rate shaping valve opening, the second opening pressure corresponding with the waste gate body moving to the opened position, a first closing pressure corresponding with moving the waste gate body to the closed position after being moved to the opened position if the fluid pressure acting on the diametrical areas of the upper and lower portions is less than the biasing force of the biasing member, the waste gate body being shaped such that a difference between the opening and closing pressure of the waste gate body is less than 10%.

14. A fuel injector assembly for an internal combustion engine, comprising:

- an injector body in fluid communication with a source of fuel;
- a nozzle assembly in fluid communication with the injector body and operable for dispersing fuel during an injection event;
- a high pressure fuel delivery system providing high pressure fuel to the nozzle assembly;

a regulator in fluid communication with the nozzle assembly and operable to regulate the rate and pressure of the dispersed fuel, the pressure regulator including:

a housing having a valve bore and an inlet for fluid communication between the fuel system and the valve bore;

a rate shaping valve movably supported within the valve bore between a closed position and an open position to regulate the rate of injected fuel, the rate shaping valve having a waste gate valve bore and an inlet for fluid communication between the fuel system and the waste gate valve bore; and a waste gate valve having a body movably supported within the waste gate bore between a closed position and an open position to regulate the pressure of the injected fuel;

a biasing member supported within the assembly and operable for biasing the regulator to a closed position with a predetermined force such that the regulator moves to a first open position only after the pressure in said fuel delivery system has reached a predetermined first opening pressure and such that the regulator moves to a second open position only after the pressure in said fuel delivery system has reached a predetermined second opening pressure; and wherein the waste gate body includes a first portion having a surface area in communication with the fluid delivery system in the closed and opened positions and a second portion having a surface area in communication with the fuel delivery system only in the opened position, the first opening pressure corresponding with the rate shaping valve opening, the second opening pressure corresponding with the waste gate body moving to the opened position if the fluid pressure acting on the first portion is greater than the biasing force of the biasing member, a first closing pressure corresponding with moving the waste gate body to the closed position after being moved to the opened position if the fluid pressure acting on the first and second portions is less than the biasing force of the biasing member, the waste gate body being shaped such that the surface area of the second portion is closely matched to the surface area of the first portion so that a difference between the opening and closing pressure of the waste gate body is controlled.

15. The assembly of claim 14 wherein the surface area of the second portion is less than 10% larger than the surface area of the first portion.

16. The assembly of claim 15 wherein the body is characterized by all cross-sectional portions perpendicular to a center axis of the body having a uniform diameter.

17. The assembly of claim 14 wherein the surface area of the second portion is less than 5% larger than the surface area of the first portion.

18. The assembly of claim 17 wherein the body includes a uniform diameter along an entire axial length of the body such that the surface area of the first and second portions are equal.

19. The assembly of claim 18 wherein the diameter is greater than the inlet and less than the valve bore.

20. The assembly of claim 14 wherein the body is cylindrically shaped along its entire axial length.

* * * * *